(12) United States Patent
Li et al.

(10) Patent No.: US 12,272,273 B2
(45) Date of Patent: Apr. 8, 2025

(54) FLEXIBLE DISPLAY MODULE CAPABLE OF AVOIDING ADHERING RISK

(71) Applicant: Wuhan China Star Optoelectronics Semiconductor Display Technology Co., Ltd., Wuhan (CN)

(72) Inventors: Dengqian Li, Wuhan (CN); Hai Huang, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/610,545

(22) PCT Filed: Oct. 11, 2021

(86) PCT No.: PCT/CN2021/122996
§ 371 (c)(1),
(2) Date: Nov. 12, 2021

(87) PCT Pub. No.: WO2023/050460
PCT Pub. Date: Apr. 6, 2023

(65) Prior Publication Data
US 2024/0221542 A1    Jul. 4, 2024

(30) Foreign Application Priority Data
Sep. 28, 2021    (CN) .......................... 202111142822.X

(51) Int. Cl.
*G09F 9/30*    (2006.01)

(52) U.S. Cl.
CPC .................................. *G09F 9/301* (2013.01)

(58) Field of Classification Search
CPC ....... G06F 1/1652; G06F 1/1637; G06F 1/181
See application file for complete search history.

(56) References Cited

U.S. PATENT DOCUMENTS

| 9,069,521 | B2 | 6/2015 | Lee |
| 2007/0019378 | A1 | 1/2007 | Kwon |
| 2017/0062742 | A1 | 3/2017 | Kim |
| 2021/0104694 | A1 | 4/2021 | Yee |
| 2022/0058990 | A1* | 2/2022 | Yoo .................. H10K 71/00 |

FOREIGN PATENT DOCUMENTS

| CN | 104867408 A | 8/2015 |
| CN | 206076240 U | 4/2017 |
| CN | 207558304 U | 6/2018 |

(Continued)

*Primary Examiner* — James Wu
*Assistant Examiner* — Dakota M Talbert
(74) *Attorney, Agent, or Firm* — Nathan & Associates; Menachem Nathan

(57) ABSTRACT

The present application provides a flexible display module including: a flexible display panel including a first flat portion, a bent portion, and a second flat portion; a support member disposed on a side of the first flat portion adjacent to the second flat portion, wherein the support member is defined with a groove on a side of the support member adjacent to the second flat portion, and the groove is defined at an end of the support member adjacent to the bent portion; and an adhesive member disposed in the groove of the support member and disposed between the support member and the second flat portion.

16 Claims, 2 Drawing Sheets

(56) References Cited

FOREIGN PATENT DOCUMENTS

| | | | |
|---|---|---|---|
| CN | 108628500 | A | 10/2018 |
| CN | 109377877 | A | 2/2019 |
| CN | 110082958 | A | 8/2019 |
| CN | 113066361 | A | 7/2021 |
| CN | 113112914 | A | 7/2021 |
| CN | 113393773 | A | 9/2021 |

* cited by examiner

FLEXIBLE DISPLAY MODULE CAPABLE OF AVOIDING ADHERING RISK

FIELD OF INVENTION

The present application is related to the field of display technology and specifically to a flexible display module.

BACKGROUND OF INVENTION

Currently, foldable organic light-emitting diode display modules tend to be thinner to reduce their weights and thicknesses.

Therefore, a technical problem to be solved is how to realize thinner foldable organic light-emitting diode display modules.

SUMMARY OF INVENTION

A purpose of the present application is to provide a flexible display module to make a thickness of a region of a bent portion of the flexible display module thinner while ensuring a thickness of an adhesive member to prevent bubbles during adhering that may lead to an adhering risk.

In order to realize the above purpose, technical solutions are as follows.

A flexible display module includes:
  a flexible display panel including a first flat portion, a bent portion, and a second flat portion, wherein the bent portion connects the first flat portion and the second flat portion, and the first flat portion and the second flat portion are parallel to each other;
  a support member disposed on a side of the first flat portion adjacent to the second flat portion and positioned between the first flat portion and the second flat portion, wherein the support member is defined with a groove, the groove is defined on a side of the support member adjacent to the second flat portion, the groove is defined at an end of the support member adjacent to the bent portion, and the support member is a steel sheet; and
  an adhesive member disposed in the groove of the support member and disposed between the support member and the second flat portion, wherein a thickness of the adhesive member is greater than a depth of the groove.

The present application provides the flexible display module. The support member is defined with the groove, and the adhesive member is disposed in the groove and disposed between the second flat portion and the support member. Therefore, the thickness of the region of the bent portion of the flexible display module is made thinner while ensuring the thickness of the adhesive member to prevent the thickness of the adhesive member from being too thin to cause the bubbles during adhering that may lead to the adhering risk.

DETAILED DESCRIPTION OF EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application.

Figure 1:
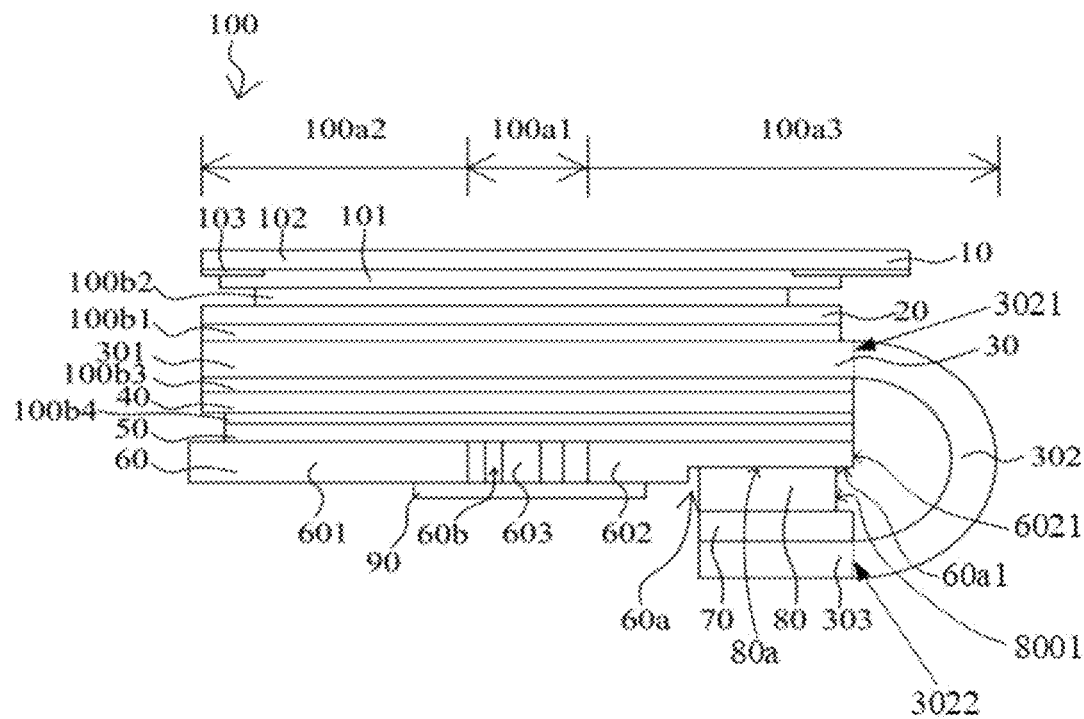
FIG. 1 is a cross-sectional schematic diagram of a flexible display module according to an embodiment of the present application.
Figure 2:
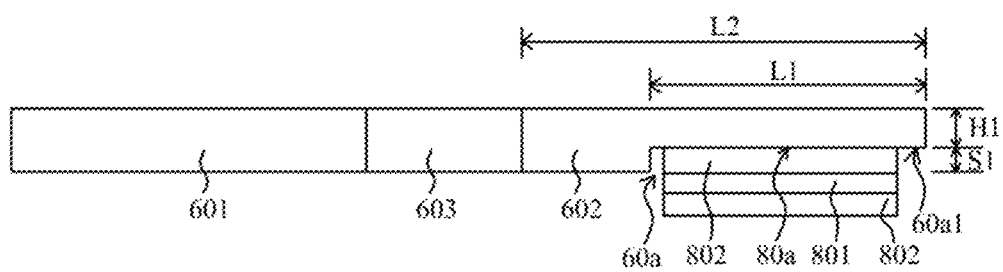
FIG. 2 is a partial enlarged schematic diagram of an adhesive member of the flexible display module shown in FIG. 1 disposed in a first groove of a support member.
Figure 3:
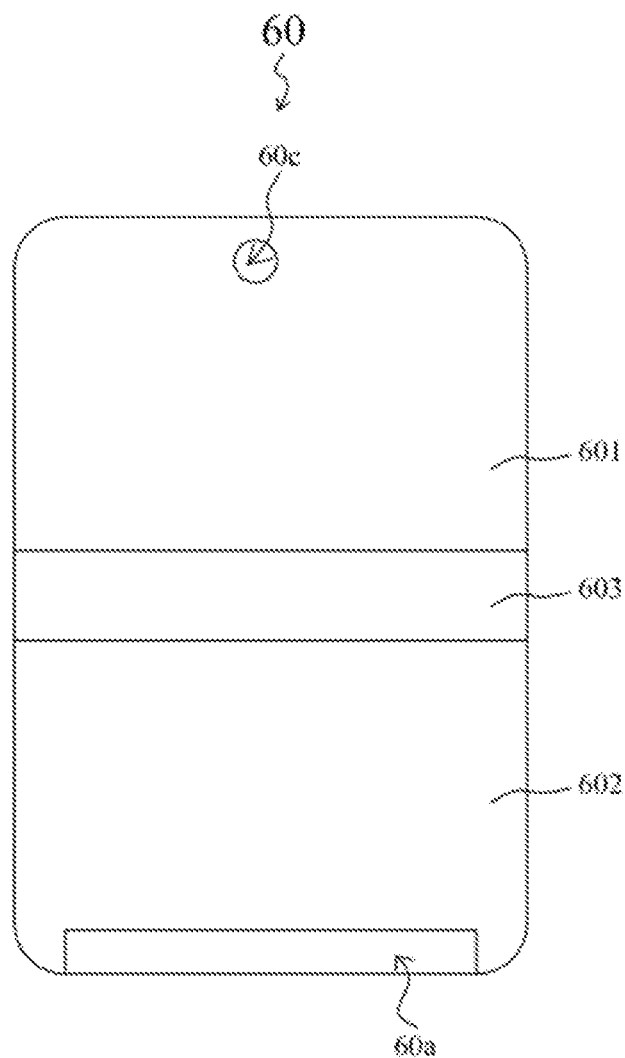
FIG. 3 is a schematic diagram of a plane view of the support member of the flexible display module shown in FIG. 1.

Please refer to FIGS. 1-3. FIG. 1 is a cross-sectional schematic diagram of a flexible display module according to an embodiment of the present application. FIG. 2 is a partial enlarged schematic diagram of an adhesive member of the flexible display module shown in FIG. 1 disposed in a first groove of a support member. FIG. 3 is a schematic diagram of a plane view of the support member of the flexible display module shown in FIG. 1. The flexible display module 100 is a foldable flexible display module. The flexible display module 100 includes a folding region 100a1, a first non-folding region 100a2, and a second non-folding region 100a3. The folding region 100a1 is positioned between the first non-folding region 100a2 and the second non-folding region 100a3. The flexible display module 100 includes a protective cover plate 10, a polarizer 20, a flexible display panel 30, a first backplate 40, a buffer layer 50, a support member 60, a second backplate 70, and an adhesive member 80.

In this embodiment, the flexible display panel 30 is an organic light-emitting diode display panel. The flexible display panel 30 includes a first flat portion 301, a bent portion 302, and a second flat portion 303. The bent portion 302 connects the first flat portion 301 and the second flat portion 303. The first flat portion 301 and the second flat portion 303 are parallel to each other. Both the first flat portion 301 and the second flat portion 303 are flat-shaped. The bent portion 302 is semicircular-curve-shaped. The first flat portion 301 is a display portion of the flexible display panel. The bent portion 302 and the second flat portion 303 are non-display portions of the flexible display panel. The second flat portion 303 is positioned on a back side of a light-emitting surface of the first flat portion 301.

In this embodiment, the polarizer 20 is disposed on the light-emitting surface of the first flat portion 301. The polarizer 20 and the first flat portion 301 are connected through the first adhesive layer 100b1. The first adhesive layer 100b1 is a pressure-sensitive adhesive layer.

In this embodiment, the protective cover plate 10 is disposed on a side of the polarizer 20 away from the flexible display panel 30. The protective cover plate 10 and the polarizer 20 are connected through a second adhesive layer 100b2. The protective cover plate 10 includes an ultra-thin glass 101, a protective film 102, and a light-shielding pattern 103. A third adhesive layer (not shown) is disposed between the ultra-thin glass 101 and the protective film 102. The ultra-thin glass 101 and the polarizer 20 are connected through the second adhesive layer 100b2. The protective film 102 is disposed on a side of the ultra-thin glass 101 away from the polarizer 20. The light-shielding pattern 103 is frame-shaped and is disposed between the ultra-thin glass 101 and the protective film 102. The protective film 102 includes a polymer film and a scratch-resistant coating. The scratch-resistant coating is disposed on a side of the polymer film away from the ultra-thin glass 101. The polymer film layer is polyethylene terephthalate. The second adhesive layer 100b2 is an optically transparent adhesive layer.

In this embodiment, the first backplate 40 is configured to support the first flat portion 301 of the flexible display panel 30. The first backplate 40 is disposed on the back side of the light-emitting surface of the first flat portion 301 of the flexible display panel 30. The first backplate 40 is connected to a back of a display surface of the first flat portion 301 of the flexible display panel 30 through a fourth adhesive layer 100b3. The first backplate 40 is made of polyethylene terephthalate or polyimide. The fourth adhesive layer 100b3 is a pressure-sensitive adhesive layer.

In this embodiment, the buffer layer 50 is disposed on a side of the first backplate 40 away from the first flat portion 301. A fifth adhesive layer 100b4 is disposed between the buffer layer 50 and the first backplate 40. The buffer layer 50 is a foam layer. A side surface of the buffer layer 50 is flush with the first backplate 40. The fifth adhesive layer 100b4 is a transparent adhesive layer.

In this embodiment, the support member 60 is disposed on a side of the first flat portion 301 adjacent to the second flat portion 303 and is positioned between the first flat portion 301 and the second flat portion 303. The support member 60 includes a first support portion 601, a second support portion 602, and a patterned portion 603. The patterned portion 603 is disposed between the first support portion 601 and the second support portion 602. The first support portion 601 is a portion of the support member 60 corresponding to the first non-folding region 100a2. The second support portion 602 is a portion of the support member 60 corresponding to the second non-folding region 100a3. The patterned portion 603 is a portion of the support member 60 corresponding to the folding region 100a1. The second support portion 602 is disposed on a side of the first support portion 601 adjacent to the bent portion 302. The first support portion 601 and the second support portion 602 function to support film layers above the support member 60. The patterned portion 603 makes the flexible display module 100 easier to fold. Specifically, the support member 60 is a steel sheet.

In this embodiment, the support member 60 includes a first groove 60a. The first groove 60a is defined on a side of the support member 60 adjacent to the second flat portion 303. The first groove 60a is defined at an end of the support member 60 adjacent to the bent portion 302. The first groove 60a on the support member 60 is formed by using a film photolithography mask as a photomask, followed by cleaning the support member 60, coating a photosensitive layer, exposing and developing the photosensitive layer, and etching the support member 60 with an acid etching solution, and then the first groove 60a is defined. As shown in FIG. 1, the support member 60 includes a third surface 6021 opposite to the bent portion 302, and both a boundary 3021 between the first flat portion 301 and the bent portion 302 and a boundary 3022 between the second flat portion 303 and the bent portion 302 are flushed with the third surface 6021 in a thickness direction of the support member 60. Furthermore, the adhesive member 80 includes a surface 8001 opposite to the bent portion 302, and the surface 8001 is not flushed with the third surface 6021 in the thickness direction of the support member 60, continuously referring to FIG. 1.

Specifically, the first groove 60a is defined on a side of the second support portion 602 adjacent to the second flat portion 303. The first groove 60a is defined at an end of the second support portion 602 adjacent to the bent portion 302, and the first groove 60a is defined along an edge of the second support portion 602 adjacent to the bent portion 302. A shape of a cross-section of the first groove 60a and a shape of a longitudinal section are both rectangular.

In this embodiment, a thickness H1 of a portion of the support member 60 corresponding to the first groove 60a in a thickness direction of the support member 60 is greater than or equal to a depth S1 of the first groove 60a, so as to ensure that the portion of the support member 60 corresponding to the first groove 60a in the thickness direction of the support member 60 can still provide sufficient support for the film layers thereon. A thickness of the support member 60 ranges from 0.08 millimeters to 0.25 millimeters. A depth of the first groove 60a ranges from 0.05 millimeters to 0.15 millimeters, for example, 0.02 millimeters, 0.04 millimeters, 0.06 millimeters, and 0.08 millimeters.

In this embodiment, when the flexible display module 100 is in a flattened state, in a direction of the patterned portion 603 toward the second support portion 602, which is a length direction of the support member 60, a size L1 of the first groove 60a is smaller than a size L2 of the second support portion 602. Therefore, the first groove 60a can provide enough space for accommodating the adhesive member 80, and prevent a size of the first groove 60a from being too large to affect a support performance of the second support portion 602. A ratio of L1 to L2 ranges from 1/14 to 1/2, so that the first groove 60a can accommodate the adhesive member 80 with a preset size to ensure an adhesive performance, and at the same time, the support performance of the second support portion 602 will not be significantly impaired due to the first groove 60a. This configuration ensures a balance between the adhesive performance of the adhesive member 80 and the support performance of the support member 60. Specifically, the ratio of L1 to L2 can be 1/14, 1/12, 1/10, 1/8, 1/7, 1/6, 1/5, 1/4, 1/3, and 1/2. Specifically, L1 ranges from 5 millimeters to 20 millimeters, and L2 ranges from 40 millimeters to 200 millimeters.

In this embodiment, the adhesive member 80 is disposed in the first groove 60a of the support member 60 and is disposed between the support member 60 and the second flat portion 303. The second backplate 70 is disposed between the second flat portion 303 and the adhesive member 80, and the adhesive member 80 connects the second backplate 70 and the second flat portion 303. The second backplate 70 and the second flat portion 303 are connected through an adhesive layer. Therefore, while the second flat portion 303 is fixed to a back side of the first flat portion 301, the thickness of a region of the bent portion of the flexible display module 100 is made thinner, and a thickness of the adhesive member 80 is ensured to prevent the thickness of the adhesive member 80 from being too thin to cause bubbles that may lead to an adhering risk. In addition, a configuration of the first groove 60a increases the depth of the first groove 60a and increases the thickness of the adhesive member 80. While thinning the thickness of the region of the bent portion of the flexible display module 100, an adhesive strength of the adhesive member 80 to adhere the support member 60 and the second flat portion 303 is increased. The thickness of the adhesive member 80 is greater than or equal to 0.1 millimeters. For example, the thickness of the adhesive member 80 is 0.1 millimeters, 0.12 millimeters, 0.14 millimeters, 0.16 millimeters, or 0.18 millimeters.

It should be explained that, compared with the support member 60 where the first groove is not defined, the present application defines the first groove 60a on the support member 60, disposes the adhesive member 80 in the first groove 60a, and connects the adhesive member 80 to the second flat portion 303. This reduces a bending diameter of the bent portion of the flexible display panel 30, for example, from 0.64 millimeters in the prior art to 0.5 millimeters. In addition, since a design of the protective cover plate, the polarizer, the flexible display panel, the first backplate, the buffer layer, etc. that make up the flexible display module has reached a best matching design, a performance of the flexible display module will be affected and will not be optimal if these laminated layers are simply thinned. A partial grooving design performed on the support member of this embodiment does not affect an overall performance of the flexible display module. Meanwhile, the thickness of the region of the bent portion of the flexible display module being thinner is realized, and the thickness of the adhesive member is prevented from being too thin to cause the bubbles during adhering.

In this embodiment, the thickness of the adhesive member 80 is greater than the depth of the first groove 60a, so as to prevent the second backplate 70 and the support member 60 from contacting and causing peeling between the second backplate 70 and the second flat portion 303.

In this embodiment, an orthographic projection of the adhesive member 80 on the support member 60 is positioned in the first groove 60a, and an area of the first surface 80a of the adhesive member 80 is less than an area of the second surface 60a1 of the first groove 60a. The first surface 80a is a contact surface of the adhesive member 80 and the first groove 60a, and the second surface 60a1 is a surface of the first groove 60a facing the first surface 80a, so as to adapt an assembly accuracy of a laminating device for the adhesive member 80. This ensures that the adhesive member 80 can fit in the first groove 60a, and a side surface of the adhesive member 80 adjacent to the bent portion 302 is retracted into the first groove 60a to prevent the adhesive member 80 and the bent portion 302 from adhering. In the length direction of the support member 60, a length of the first groove 60a is greater than a length of the adhesive member 80 by 0.1 millimeters to 0.3 millimeters. In a width direction of the support member 60, a width of the first groove 60a is greater than a width of the adhesive member by 0.1 millimeters to 0.3 millimeters.

In this embodiment, the support member 60 further includes a plurality of second grooves 60b defined on the patterned portion 603. The second grooves 60b are arranged at intervals, and the second grooves 60b penetrate through the patterned portion 603, so that the patterned portion 603 has sufficient flexibility to be folded. A design of the second groove 60b can adopt an existing design, which will not be described in detail herein.

In this embodiment, the adhesive member 80 includes a base material 801 and two adhesive layers 802. Two adhesive layers 802 are respectively arranged on two opposite sides of the base material 801. One of the adhesive layers 802 is disposed in the first groove 60a and connected to the support member 60. The other one of the adhesive layers 802 is disposed on a side of the base material 801 adjacent to the second flat portion 303 and is connected to the second backplate 70. A thickness of each of the adhesive layers 802 is greater than a thickness of the base material 801 to increase an adhesive strength between the adhesive member 80 and the support member 60 and the second backplate 70. For example, the thickness of one of the adhesive layers 802 is 35 micrometers, and the thickness of the base material 801 is 25 micrometers. Alternatively, the thickness of one of the adhesive layers 802 is less than the thickness of the base material 801 to increase a stiffness of the adhesive member 80. For example, the thickness of the base material 801 is 50 micrometers, and the thickness of one of the adhesive layers 802 is 25 micrometers. The base material 801 is a polyethylene terephthalate film layer.

After a thickness of the adhesive member 80 of a traditional flexible display module is thinned, it will cause the adhesive member 80 to become an adhesive layer with a thickness less than 0.05 millimeters, which will lead to the adhering risk that cause bubbles during adhering of the adhesive member 80. In this embodiment, on a basis of the configuration of the first groove 60a, the thickness of the adhesive member 80 may not be thinned or may even increase, so that the adhesive member 80 can include the base material to increase the stiffness of the adhesive member 80 and prevent wrinkling and deformation of the adhesive member 80.

In this embodiment, a color of the adhesive member 80 is white or black, so that laminating equipment can recognize the adhesive member 80.

In this embodiment, the flexible display module 100 further includes a tape 90. The tape 90 is disposed on a side of the support member 60 away from the buffer layer 50. Two ends of the tape 90 are respectively connected to the first support portion 601 and the second support portion 602 of the support member 60 and overlap with the patterned portion 603, thereby preventing impurities from falling into the second groove 60b that affects a folding performance of the flexible display module 100.

In this embodiment, the support member 60 further includes a through-hole 60c defined on the first support portion 601. The through-hole 60c penetrates the first support portion 601 to ensure a light transmittance. The flexible display module 100 is equipped with a camera corresponding to the through-hole 60c.

The description of embodiments above is only for helping to understand technical solutions of the present application and its core idea. It should be understood that for a person of ordinary skill in the art can make various modifications of the technical solutions of the embodiments of the present application above. However, it does not depart from the scope of the technical solutions of the embodiments of the present application.

What is claimed is:

1. A flexible display module, comprising:
   a flexible display panel comprising a first flat portion, a bent portion, and a second flat portion, wherein the bent portion connects the first flat portion and the second flat portion, and the first flat portion and the second flat portion are parallel to each other;
   a support member disposed on a side of the first flat portion adjacent to the second flat portion and positioned between the first flat portion and the second flat portion, wherein the support member is defined with a groove on a side of the support member adjacent to the second flat portion, the groove is defined at an end of the support member adjacent to the bent portion, and the support member is a steel sheet; and
   an adhesive member disposed in the groove of the support member and disposed between the support member and the second flat portion, wherein a thickness of the adhesive member is greater than a depth of the groove;
   wherein an orthographic projection of the adhesive member on the support member is positioned in the groove; and
   an area of a first surface of the adhesive member is less than an area of a second surface of the groove, the first surface is a contact surface of the adhesive member and the groove, and the second surface is a surface of the groove facing the first surface;
   wherein a third surface of the support member which is opposite to the bent portion is flushed with both a boundary between the bent portion and the first flat portion and a boundary between the bent portion and the second flat portion in a thickness direction of the support member; and a surface of the adhesive member opposite to the bent portion and the third surface are not flush in the thickness direction of the support member.

2. The flexible display module according to claim 1, wherein a thickness of a portion of the support member corresponding to the groove in a thickness direction of the support member is greater than or equal to the depth of the groove.

3. The flexible display module according to claim 1, wherein the support member comprises:
a first support portion;
a second support portion disposed on a side of the first support portion adjacent to the bent portion, wherein the groove is defined at an end of the second support portion adjacent to the bent portion; and
a patterned portion disposed between the first support portion and the second support portion;
wherein in a direction from the patterned portion to the second support portion, a size of the groove is less than a size of the second support portion.

4. The flexible display module according to claim 1, wherein the adhesive member comprises:
a base material; and
two adhesive layers respectively disposed on two opposite sides of the base material, one of the adhesive layers is disposed in the grove and is connected to the support member, and the other one of the adhesive layers is disposed between the second flat portion and the base material.

5. The flexible display module according to claim 4, wherein a thickness of the base material is greater than a thickness of each of the adhesive layers.

6. The flexible display module according to claim 1, further comprising a backplate, wherein the adhesive member is disposed between the backplate and the support member and connects the backplate and the support member, and the backplate is connected to the second flat portion through adhesive layers.

7. The flexible display module according to claim 1, wherein the flexible display module is a foldable flexible display module, and a thickness of the adhesive member is greater than or equal to 0.1 millimeters.

8. A flexible display module, comprising:
a flexible display panel comprising a first flat portion, a bent portion, and a second flat portion, wherein the bent portion connects the first flat portion and the second flat portion, and the first flat portion and the second flat portion are parallel to each other;
a support member disposed on a side of the first flat portion adjacent to the second flat portion and positioned between the first flat portion and the second flat portion, wherein the support member is defined with a groove on a side of the support member adjacent to the second flat portion, and the groove is defined at an end of the support member adjacent to the bent portion; and
an adhesive member disposed in the groove of the support member and disposed between the support member and the second flat portion;

wherein an orthographic projection of the adhesive member on the support member is positioned in the groove; and an area of a first surface of the adhesive member is less than an area of a second surface of the groove, the first surface is a contact surface of the adhesive member and the groove, and the second surface is a surface of the groove facing the first surface;

wherein a third surface of the support member which is opposite to the bent portion is flushed with both a boundary between the bent portion and the first flat portion and a boundary between the bent portion and the second flat portion in a thickness direction of the support member; and a surface of the adhesive member opposite to the bent portion and the third surface are not flush in the thickness direction of the support member.

9. The flexible display module according to claim 8, wherein a thickness of a portion of the support member corresponding to the groove in a thickness direction of the support member is greater than or equal to the depth of the groove.

10. The flexible display module according to claim 8, wherein the support member comprises:
a first support portion;
a second support portion disposed on a side of the first support portion adjacent to the bent portion, wherein the groove is defined at an end of the second support portion adjacent to the bent portion; and
a patterned portion disposed between the first support portion and the second support portion;
wherein in a direction from the patterned portion to the second support portion, a size of the groove is less than a size of the second support portion.

11. The flexible display module according to claim 8, wherein the adhesive member comprises:
a base material; and
two adhesive layers respectively disposed on two opposite sides of the base material, one of the adhesive layers is disposed in the grove and is connected to the support member, and the other one of the adhesive layers is disposed between the second flat portion and the base material.

12. The flexible display module according to claim 11, wherein a thickness of the base material is greater than a thickness of each of the adhesive layers.

13. The flexible display module according to claim 8, wherein a thickness of the adhesive member is greater than a depth of the groove.

14. The flexible display module according to claim 8, wherein the support member is a steel sheet.

15. The flexible display module according to claim 8, further comprising a backplate, wherein the adhesive member is disposed between the backplate and the support member and connects the backplate and the support member, and the backplate is connected to the second flat portion through adhesive layers.

16. The flexible display module according to claim 8, wherein the flexible display module is a foldable flexible display module, and a thickness of the adhesive member is greater than or equal to 0.1 millimeters.

* * * * *